United States Patent [19]

Collins et al.

[11] 4,039,289

[45] Aug. 2, 1977

[54] SULPHUR-BURNING AND GASEOUS PRODUCTS ABSORPTION SYSTEM AND COMPONENTS THEREFOR

[75] Inventors: Dwight D. Collins, Covina; Darrell R. Harmon, Lemoore, both of Calif.

[73] Assignee: Chemsoil Corporation, Bakersfield, Calif.

[21] Appl. No.: 622,662

[22] Filed: Oct. 15, 1975

Related U.S. Application Data

[63] Continuation of Ser. No. 113,289, Feb. 8, 1971, abandoned.

[51] Int. Cl.² .................................................. C01B 17/54
[52] U.S. Cl. ............................................. 23/262; 23/278; 23/283; 423/543; 423/542; 261/94; 261/95; 261/96; 261/97; 261/98; 261/99; 55/233; 220/364; 277/22; 34/242
[58] Field of Search ................................. 23/278, 262, 283; 423/543, 542; 261/94, 95, 96, 97, 98, 99; 55/233; 220/364; 277/22; 34/242

[56] References Cited

U.S. PATENT DOCUMENTS

| 204,206 | 5/1878 | Eames | 23/280 UX |
|---|---|---|---|
| 1,141,266 | 6/1915 | Raschig | 23/283 |
| 1,364,716 | 1/1921 | Clayton | 23/278 |
| 2,090,386 | 8/1937 | Ferguson | 423/542 |
| 2,807,522 | 9/1957 | Russell | 23/278 |
| 3,006,436 | 10/1961 | Starbuck et al. | 261/95 X |
| 3,226,201 | 12/1965 | Harmon | 23/278 X |
| 3,314,766 | 4/1967 | Mukherji | 23/278 |
| 3,331,608 | 7/1967 | Charrault et al. | 277/22 X |
| 3,627,134 | 12/1971 | Mattson | 210/192 |
| 3,907,510 | 9/1975 | Collins | 23/278 |

Primary Examiner—James H. Tayman, Jr.
Attorney, Agent, or Firm—Donald D. Mon

[57] ABSTRACT

A sulphur-burning and gaseous products absorption system incorporating control means to establish generation of sulphur dioxide at a rate which is compatible with the capacity of absorption means for absorption of the gases by water, together with controls which make the system fail-safe even when unattended. In order to provide an absorption efficiency compatible with clean air standards, a unique absorption tower is provided, together with pre-cooling means further to improve the absorption tower efficiency. Further, the control efficiency and the purity of the product are improved by ebullition control. A unique joint is provided for sealing the sulphur-burning tower against undesirable leakage which also enables this tower readily to be disassembled for maintenance and repair.

10 Claims, 7 Drawing Figures

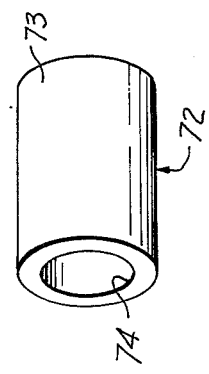
Fig. 7
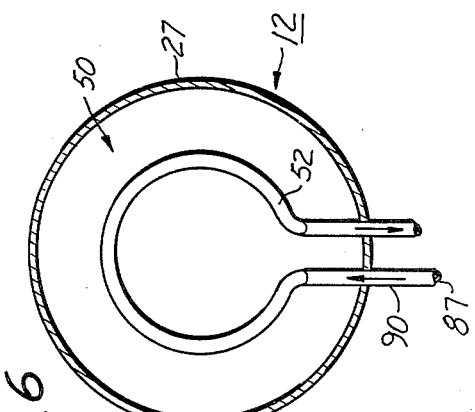
Fig. 6
Fig. 1
INVENTORS:
DWIGHT DIXON COLLINS,
DARRELL R. HARMON
BY
Hayes & Mon
ATTORNEYS.

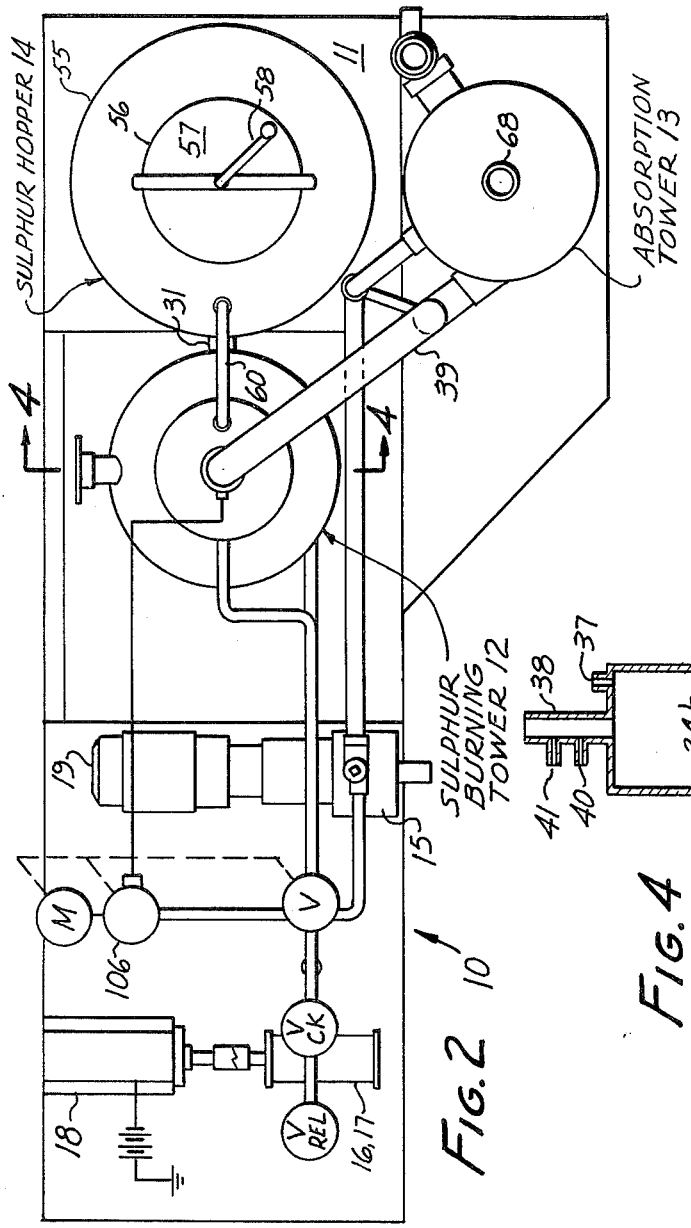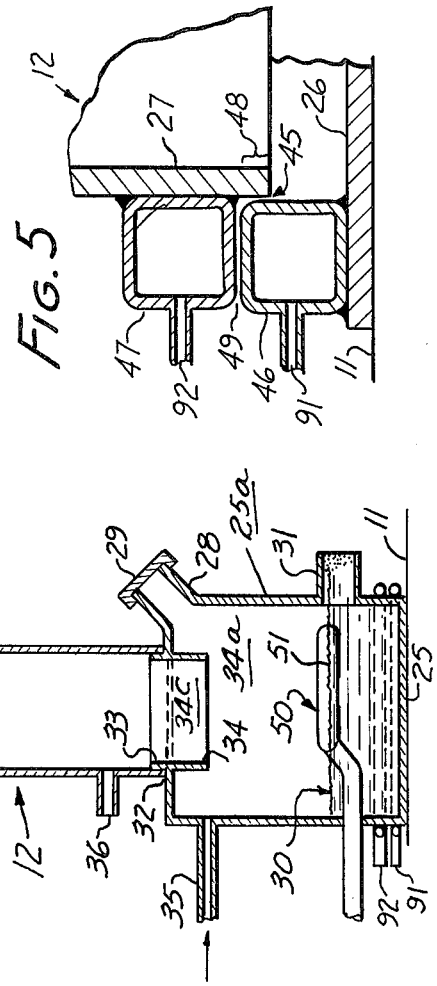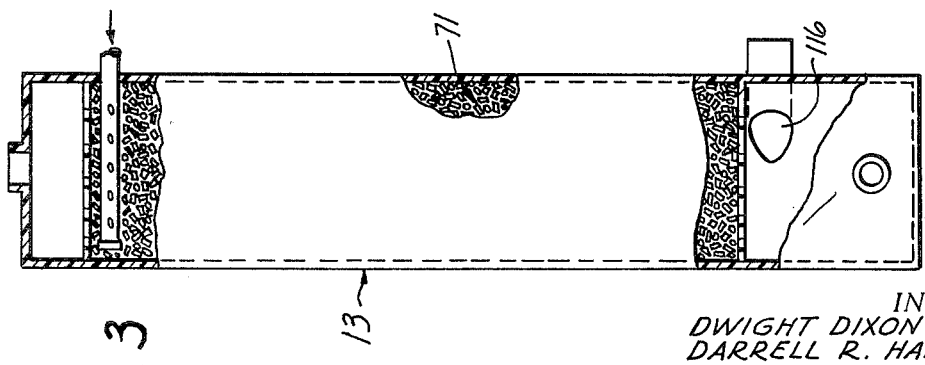

SULPHUR-BURNING AND GASEOUS PRODUCTS ABSORPTION SYSTEM AND COMPONENTS THEREFOR

This is a continuation of application Ser. No. 113,289, filed Feb. 8, 1971, and now abandoned.

This invention relates to the burning of sulphur for generation of sulphur dioxide and its subsequent absorption in water for the purpose of developing an acid solution to be used for the treatment of soils.

The improvement of soils, especially clay-type soils of the class found in the central valley of California, by the application of acidic solutions is well known. An advantageous technique resides in the burning of sulphur to sulphur dioxide, its absorption in the irrigating water and the subsequent application of the treated irrigating water to the ground. The term "absorption" is used herein in a broad general sense to include not only the absoption of the sulphur dioxide as a true gas-liquid solution, but also its reaction with water to form sulphurous acid, and other compounds with minerals which may be present in the water. The word "absorption" is, therefore, used generically herein to describe the transfer of the sulphur dioxide gas into the water phase, and its elimination from the effluent gases from the system.

As desirable as sulphur dioxide is in the treatment of soils, its generation and application to the ground still involve some highly sophisticated problems, largely related to efficiency of the process in using its raw materials, and to the discharge of sulphur dioxide in the air in view of clean air standards. It should be realized that sulphur-burning units are preferentially used in the field where they are simply parked next to an irrigation canal, draw their water from the canal, inject the sulphur dioxide into the water, and return the treated water to the stream. This equipment is intended for use by persons who are relatively untutored in controls and in the operation of complex machinery and it must, therefore, be simple. It follows that, however simple it must be, still the efficiency and reliability of the device must be sufficient to overcome the attendant lack of skill, so that sulphur dioxide is not discharged to the atmosphere, and so that in the event of a failure of the water supply, or if extreme temperatures develop, the device will shut down.

Further, it is known that after a period of time, sulphur-burning tanks require cleaning out and maintenance, and it is necessary to gain access to the bottom of the tank. While this might seem to be a relatively easy matter, it is not so simple in practice because, by the time the tank is cooled to the extent necessary to have access to it, the sulphur has hardened, and then if it must be melted again, noxious gases are likely to be developed. It is an object of this invention to provide means for attaching the sulphur tank to its bottom which enables the tank readily to be opened by separation of its parts without the attendant disadvantages common in the prior art.

It is also known that absorption towers themselves are a critical element in the gas absorption system. The art is replete with examples of sulphur absorption towers, utilizing various packings, but their efficiency has generally been relatively low. Surprisingly enough, the simple absorption tower shown by this invention has proved to provide substantially 100 percent absorption of the gas, and the only sulphur dioxide escaping is that inherent in the small vapor pressures involved.

It is another object of this invention to provide a control for a sulphur-burning tower wherein the temperature of the effluent gases can be maintained compatible with downstream devices, averting the problems of sublimation of sulphur at excessive temperatures with consequent fouling. Furthermore, this invention enables the rate of burning of sulphur to be set by controlling the rate of supply of air to the sulphur-burning tower, and proportioning the tower air input to maintain a close control over the output temperature so as to protect the device from overheating or from operation under favorable conditions, the control being continuous, and thereby averting wide swings and emergency shutdown.

Still another object of this invention is to provide ebullition control means in the pool or burning sulphur. The sulphur is burned at a surface which is molten, and after a time is likely to bubble and snap. There also may be a rise in level of burning bubble surfaces which can flood out the controls, and some of the sulphur—which may or may not be burning—may escape and go downstream so as to contaminate the system and perhaps to reduce the efficiency of the device, quantitatively as to raw material, by choking the lines, and by throwing the absorption system out of balance unless ebullition is prevented. Ebullition control means is placed just beneath the surface of the burning sulphur in this device to prevent violent boiling, and thereby will stabilize the production of sulphur dioxide at the surface and stabilizes the system, also.

This invention is accomplished with a sulphur-burning tower, an absorption tower, and a hopper to supply the sulphur-burning tower. The sulphur-burning tower receives air from a supply source. It receives the air in a primary and a secondary air inlet, the primary air inlet being at the lower elevation of the two air inlets, and both of them being above the surface of the burning sulphur within the tank. Basically, the burning rate is set by adjusting the volumetric rate of the supply air, and a fine control is accomplished by proportioning the air supply between the primary and secondary air inlet. At the outlet of the sulphur-burning tower, there is a temperature sensor which, in order to maintain the burning rate substantially constant, operates a valve system controlling the supply of air to each of these two air inlets in a push-pull relationship such that, when the temperature goes up, the comparative volume of air to the secondary air inlet, which in general does not reach the burning surface, is increased, diluting and cooling the gases, and the volume of air to the primary air inlet which tends to reach the burning surface is descreased, at least as a proportion. The increased amount of air supply from the secondary inlet will cool the effluent gas stream to maintain its temperature substantially constant. The effluent gas stream is led to the base of an absorption tower, and water to absorb it is led to the top of the absorption tower, for counter-current flow.

According to a preferred but optional feature of this invention, the absorption tower is packed with a plurality of relatively short tubular lengths whose surfaces are made of a material which is not wetted by water. It has been found that this results in a very efficient absorption of sulphur dioxide in water.

According to preferred but optional features of the invention, a pressure sensor is led to the pump supplying water to the system so that, in the event of lack of water, air is shut off to the sulphur-burning tower, and the system shuts down in a fail-safe mode. Similarly, for the event that the temperature rises out of control, a temperature sensor is supplied in the same manner so as to shut down the supply of air, and again the system is fail-safe.

The above and other features of this invention will be fully understood from the following detailed description and the accompanying drawings, in which:

FIG. 1 is a side elevation of the presently-preferred system according to the invention;

FIG. 2 is a top view of FIG. 1;

FIG. 3 is an elevation partly in cutaway cross-section of the absoption tower of the invention;

FIG. 4 is an elevation partly in cutaway cross-section showing the sulphur-burning tower of the invention;

FIGS. 5 and 6 are fragmentary cross-sections taken at lines 5—5 and 6—6, respectively, of FIG. 1; and FIG. 7 is an oblique view of a tubular length used for packing in the absorption tower.

A sulphur-burning and gaseous products absorption system 10 is shown in FIG. 1. It is mounted to a base 11 which may conveniently be the flatbed of a trailer so as to be readily movable from place to place. Its principal elements are a sulphur-burning tower 12, an absorption tower 13, a sulphur hopper 14, a self-priming water pump 15, an air compressor 16, and a variable speed drive 17 to drive the compressor. A motor 18 (FIG. 2) drives the air compressor through the variable speed drive, and motor 19 drives the water pump.

The sulphur-burning tower 12 is best shown in FIGS. 4 and 5. It includes a bottom member 25, which is placed upon base 11. The bottom member includes a bottom plate 26. A sidewall member 27 rises above the bottom member. An access port 28 with a cap 29 is formed in the sidewall member which gives access to the inside of the tower in order to light the same. For lighting the sulphur 30 which is burned therein, it is common practice to throw a flare, or some other pyrotechnic device, therein. A supply conduit 31 (FIG. 1) enters through the sidewall member, and a shoulder 32 (FIG. 4) is formed at a medial point thereof. The structure which contains the sulphur and the products of combustion is sometimes called an "enclosure". An extension 33 of the sidewall member extends upwardly and includes a depending skirt 34 that depends below shoulder 32 for purposes yet to be described. An annular region is formed around the outside of the depending skirt beneath the shoulder. The term "skirt" is intended to include the overhanging portion of shoulder 32 which closes the top of the annular region. The skirt is therefore both overhanging and depending relative to the annular region.

A primary air inlet 35 enters the sidewall member below the shoulder and above the bottom of the skirt, entering tangentially into the annular region so as to give entering air a rotary motion as it enters. This rotary air motion cools the sidewalls of the sulphur-burning tower, and enables it to be made of conventional materials, without cooling jackets. A secondary air inlet 36 enters the sidewall member through the extension thereof above the shoulder. A pressure balance port 37 is formed in the top of the sidewall member, and a neck 38 containing the outlet conduit 39 departs from the top thereof. A pair of sensor ports 40, 41 are formed in the wall of the neck.

A seal 45 (FIG. 5) is formed at the bottom of the sidewall member. A pair of coolant conduits 46, 47 are respectively attached to the bottom member and the sidewall member by peripheral welds. These form flanges on the two members which adjoin one another. Furthermore, it is advantageous for coolant conduit 47 to be attached to sidewall member 27 somewhat above the bottom so as to leave a depending flange 48 thereunder, although this is optional. A leakage passage 49 is formed between the two coolant conduits. An extension of said leakage passage, which extension is optional, is formed between the conduit 46 and flange 48. It is the function of the coolant conduits to solidify molten sulphur which leaks into this region so as to form a seal preventing further leakage.

Ebullition control means 50 is formd at about the level of the supply conduit 31 and at or just below the surface 51 of the burning sulphur. This surface tends to be formed just below the upper level of the supply conduit, and in practice the ebullition control means will be placed so that it about breaks the surface of the molten sulphur. As can best be seen in FIG. 6, this means comprises a coil 52 of tubing adapted to carry water as will later be described. Instead of the loop shown in FIG. 6, spirals, grids or other shapes may be used depending upon the size of the area of the surface, its general configuration, and the amount of cooling required to prevent bubbling and violent boiling, which bubbling and boiling may result in a rise of burning surfaces toward the top of the tank that might saturate the cpacity of the controls or render them inoperative.

The following terminology is sometimes used in this specification and in the claims. The enclosure has a "bottom" which may be considered to be bottom plate 26 and that portion of the enclosure which surrounds the pool of sulphur. The enclosure has regions which are above the exposed surface of the closure. A lower region 34a is formed below the shoulder 32 and upper region 34b is formed above shoulder 32. An annular region 34a is actually a localized portion of the lower region. Primary air inlet 35 enters the lower region, discharging into the annular region at a first elevation in the lower region. A secondary inlet discharges, at a higher second elevation, into the upper region above said shoulder and above said annular region. The annular region is "closed-at-its-top". Outlet port 38 discharges from the upper region at an elevation above that of the secondary air inlet. Depending skirt 34 forms a central opening 34c which interconnects the lower and upper regions. The oxidation products resulting from the contact of the air with the sulphur pass through the central opening 36c and this central opening constitutes the only exit path of said products of oxidation (sometimes called products of combustion) from the said lower region. The outlet port is the only outlet for the products of oxidation from the tower.

Sulphur hopper 14 comprises a tank 55 with a top opening 56, having a lid 57, and a screw handle 58 for holding the lid in place. A pressure balance port 59 (FIG. 1) is formed in the top of the sulphur hopper and is joined by balancing conduit 60 to the pressure balance port 37 in the sulphur-burning tower so as to balance the top pressures of the sulphur-burning tower and the sulphur hopper, thereby preventing pressure-lock in the sulphur-burning tower.

The absorption tower 13 in this invention is able to operate at such a relatively low and efficient temperature that its shell 65 may be made of fiberglas. It rests atop base 11 and has a bottom 66, a cylindrical wall 66a, and a top 67. Top 67 is formed with a gas vent 68, and inside the tank there are grates 69, 70. These grates are perforated barriers which permit the ready flow of gas and fluids past them, but hold back and in position a packing 71 between them. A packing element for packing 71 is shown in FIG. 7. It is a relatively short length of tubing 72 which has a cylindrical outer surface 73 and a cylindrical inner bore 74. It has been found advantageous to utilize in a tower, about 2 feet in diameter and on the order of a group of about 8 feet in height, a packing of a group of these tubes, each having an outer diameter of approximately ¾ inch, a wall thickness of approximately 1/16 inch, and a length of about 1 inch. These are arbitrary values, and wide variations of dimensions can be used advantageously. These lengths of tubing are dumped randomly into the shell and form a tortuous maze of passageways from the top to the bottom, because of their random orientation and large number.

Furthermore, the surface of the tubings is made of material which is non-wettable by water. It is possible to coat metallic devices so as to achieve this function, but more conveniently, one will simply cut up lengths of poly-vinyl chloride tubing to form these paking elements. Poly-vinyl chloride surfaces are not wettable by water, and water will tend to form droplets on such a surface rather than to spread out in a smooth sheet. It is recognized that in absorption processes, it has been conventionally regarded as best practice to spread out the liquid in a broad sheet, which is intended to absorb the gas, so as to give the maximum contact surface. However, with this device, it has been found that, along with the movement of the gas and liquid phases as they pass through the tower, best absorption occurs if the liquid cannot wet the surface and spread out over it. It has been found that in this tower, an absorption action occurs all through its length, and there exists a mist and rain of water to contact the gas at the top. Little if any sulphur dioxide escapes through the stack, and also very little if any, of the water or liquid phase substances pass through the stack. The effluent from the bottom of the tower contains substantially all, even to nearly immeasurable differences, of the products of sulphur combustion of the sulphur-burning tower.

Also near the bottom of the absorption tower, there is an outlet port 75 which terminates in a standpipe 76. The standpipe has a side port 77 from which the effluent liquid is returned to the canal and has above it a siphon breaker tube 78 which rises well above the anticipated level 79 of liquid within the absorption tower in order that the liquid may flow away from the tower without hindrance. This level should be at or below the lower grating, because this is not intended to be a flooded tower. Quite to the contrary, the packing is intended to be free of a gross body of liquid and to provide the environment for efficient absorption of sulphur dioxide in water. Should there be a reverse pressure, the siphon breaker tube would break it and will prevent the flooding out of the sulphur-burning tower, which might possibly be disastrous.

There have now been described the particular major components of this system, and there remains to be described the supply and control systems.

The water pump 15 has a hose 80 intended to dip into a canal 81, or other source of water to be pumped, from which this water is pumped to the head 82 of the pump. A water line 83 then leads upwardly and discharges into the inlet port 84 of the absorption tower, from which the water flows downwardly through the packing. The head 82 also provides water pressure for other purposes, one of which is a sensor line 85 which exerts its pressure at a pressure sensor 86 for purposes yet to be described. Also, conduit 87 (FIG. 1) is connected to the inlet 90 of the ebullition control means 50, the outlet of which discharges back into the canal. In similar manner, conduits 91, 92 are connected from the head to coolant conduits 46, 47, respectively, so that cooling water flows through them circumferentially and then discharges into the canal.

An air filter 95 is placed upstream of air compressor 16 and filters the air which reaches the compressor, and the compressed air from the compresser is sent through a line 96 to the sulphur-burning tower. It passes a pressure relief valve 97, which establishes a maximum downstream pressure and blows off to atmosphere any excessive pressures. Thereafter, a check valve 98 is passed which prevents backflow. The volume of air supplied will be determined by the variable speed drive 17, which is adjusted to provide the rate of air flow needed to burn sulphur at a predetermined rate. The relief valve relieves overpressures. Beyond valve 98 there is a tee 99 at which the air flow divides into a primary air line 100 and a secondary air line 101. These air lines respectively connect to primary and secondary air inlets 35 and 36, respectively. In each line there is a valve means 102, 103, respectively.

Persons skilled in the art will recognize that these two valves may readily be combined as a flow divider valve, or instead may be provided as two separate valves. In any event, and as is represented by actuation lines 104 (FIG. 1), they are in push-pull relationship, the actions of which are inverse, which is to say that, if flow through valve 102 is increased. The flow through 103 is decreased on a relative basis. It may be that the flow through one will be held constant while the other is varied, but in any event their ratio will change as a result of actuation by an actuator 105, which may be such as a valve motor. This actuator is under the control of a valve control 106 which in turn is responsive to temperature sensor 107.

Temperature sensor 107 is a primary control and is set to be responsive to the temperature of the stack gases escaping from the sulphur-burning tower. Its objective is to maintain these at a substantially constant pre-set the temperature. There need be no detailed description of the sensors, nor of any circuits responsive thereto, because such are broadly known in the art. Sensor 107 leads to a responsive device 109, which is effective upon the valve control 106. In the event the temperature begins to increase, its effect on control 106 is to cause actuator 105 to reduce the flow through the primary line 100 by throttling valve 102, thereby to cut down the flow of air which would oxidize the surface of the sulphur, and also inversely to relatively increase the cooling air through secondary line 101 by opening valve 103. The inverse situation is also true; that is, that if the sensed temperature decreases, it will relatively increase the flow through conduit 100 and decrease that through conduit 101 by adjustment of valves 102 and 103.

Sensor 108 is an over-temperature sensor with a responsive device 110 effective on the control, and should the process get out of hand to the extent that it cannot be controlled by a response to sensor 107, it will cause the control to shut off power to the motors and shut down the system. Similarly, should the water supply fail, the sensor 86 will cause the switch to cut off power to the motors, and the process will shut down. The device is, therefore, entirely fail-safe.

There is an additional feature of this invention to which reference will now be made. This is a pre-cooler interconnection 115 (FIG. 1) comprising a tubing interconnecting water line 83 and the gas line leading to inlet port 116 of the absorption tower. This will cause water to be sprayed into the relatively hot flow of gases to cool the same before they enter the bottom of the absorption tower, thereby reducing the temperature of the in-flowing gases and increasing the adsorption efficiency of the water flowing downwardly through the tower.

This invention comprises a number of components of a sulphur-burning system which enable sulphur to be burned in a relatively quiescent state, its gases to be pre-cooled to an optimum temperature for absorption by incoming air, to be controlled closely as to the rate of production of the effluent gases, and to be effectively fail-safe in the event something goes wrong even while the device is not attended.

This invention is not to be limited by the embodiments shown in the drawings and described in the description, which are given by way of example and not of limitation, but only in accordance with the scope of the appended claims.

We claim:

1. A sulphur-burning system including: a sulphur-burning tower having a bottom wall, a sidewall, and a dimension of height, with a level at which sulphur is to be burned, there being a primary air inlet into said tower at a first elevation above said surface and a secondary air inlet at a second elevation above said first elevation, air supply means for supplying air to said air inlets, a temperature sensor in said tower above said second elevation, valve means disposed between said air supply means and each of said air inlets, valve control means responsive to said temperature sensor and adapted to control the said valve means and thereby to control air flow into said inlets, whereby to maintain a substantially constant temperature at said temperature sensor; an absorption tower for the absorption of gases produced from the aforesaid sulphur-burning tower comprising a tank having a fluid-tight sidewall and bottom, a gas entry port at a first elevation, a water entry port at a second higher elevation, and between them a randomly packed column of lengths of tubing, the surfaces of said tubings being formed of material which is not wetted by water or by water containing the gases absorbed in the tank, and an outlet below the said gas entry port; a conduit supplying gas from the sulphur-burning tower to the gas entry port; a conduit supplying water to the water entry port; a lateral connection between said gas supplying conduit and said water supplying conduit whereby gas from the sulphur-burning tower entering the absorption tower is pre-cooled by water flowing through the lateral connection into said gas supplying conduit; a peripheral skirt disposed inside the sulphur-burning tower between the said two elevations and space from the inside wall of the tower so as to leave a closed-at-its-top annular region therebetween, the primary air inlet discharging into the said annular region, the sulphur-burning tower including a peripheral sidewall member and a bottom member which adjoin one another with a leakage passage formed therebetween; an alignment flange formed on one of said last-named members to make a telescopic fit with the other of said members; and cooling means for cooling the said leakage passage in order to solidify previously molten sulphur and thereby form a seal therein, said cooling means comprising a coolant conduit extending peripherally around both of said last-named members adjacent to said leakage passage; and ebullition prevention means beneath the surface of the sulphur adapted to cool the region just below the surface of the sulphur to the extent required to prevent violent ebullition and expansive bubbling of the surface of the sulphur.

2. A sulphur-burning tower comprising: an enclosure adapted to contain a pool of sulphur having a surface subjected to oxidation by air, the enclosure having a region above said surface to receive the products of combustion, a primary air inlet at a first elevation above the said surface, and a secondary air inlet at an elevation above said primary air inlet, the enclosure including a peripheral sidewall member and a bottom member which adjoin and are spaced from one another with a leakage passage formed therebetween and extending around the enclosure, and cooling means adjacent to the leakage passage for cooling the said leakage passage in order to solidify previously molten sulphur and thereby form a seal therein.

3. A sulphur-burning tower comprising: an enclosure adapted to contain a pool of sulphur having a surface exposed to oxidation by air, the enclosure having a region above said surface to receive the products of combustion, a primary air inlet at a first elevation above the said surface, and a secondary air inlet at an elevation above said primary air inlet; a peripheral skirt disposed inside the enclosure between the said two elevations and spaced from the inside wall of the tower so as to leave a closed-at-its top annular region closed at its upper end therebetween, the primary air inlet discharging into the said annular region; a peripheral sidewall member and a bottom member comprising portions of the enclosure, said members adjoining one another, and being spaced from one another whereby they form a leakage passage between them which extends around the enclosure; and cooling means for cooling the said leakage passage in order to solidify previously molten sulphur and form a seal between the members.

4. A sulphur-burning tower according to claim 3 in which the cooling means comprises a coolant conduit extending peripherally around both of said members adjacent to said leakage passage to receive coolant to cool and solidify sulphur in said leakage passage.

5. A sulphur-burning tower comprising: an enclosure adapted to contain a pool of sulphur having a surface exposed to oxidation by air, the enclosure having a region above said surface to receive the products of combustion, a primary air inlet at a first elevation above the said surface, and a secondary air inlet at an elevation above said primary air inlet; a peripheral skirt disposed inside the enclosure between the said two elevations and spaced from the inside wall of the tower so as to leave a closed-at-its-top annular region closed at its upper end therebetween, the primary air inlet discharging into the said annular region; a peripheral sidewall member and a bottom member comprising portions of the enclosure, said members adjoining one another, and being spaced from one another, whereby they form a leakage passage between them which extends around the enclosure; cooling means for cooling the said leakage passage in order to solidify previously molten sulphur and form a seal between the members; and an alignment flange on one of said members making a telescopic fit with the other of said members.

6. A sulphur-burning tower comprising: an enclosure adapted to contain at the bottom of a lower region thereof a pool of sulphur having a surface to be exposed to air for oxidation thereby to form products of oxidation said enclosure also having an upper region above said lower region, a primary air inlet at a first elevation in said lower region above the said surface, a secondary air inlet at higher second elevation in said upper region, and an overhanging and depending peripheral skirt disposed inside the enclosure between the said two regions and spaced from the inside wall of the tower so as to leave closed-at-its-top annular region in said lower region adjacent to said wall which is open at its bottom end, an outlet port exiting the upper region at an elevation above the secondary air inlet, and a central opening within the skirt interconnnecting the two regions with one another and constituting the only exit path of said products of oxidation from said lower region, said upper region being disposed atop the lower region so the said products of oxidation flow from the lower region upwardly through the central opening into the upper region, the primary air inlet discharging into said annular region, and the said products of oxidation leaving the tower only through the outlet port.

7. A sulphur-burning tower according to claim 6 in which the primary air inlet enters the said annular region tangentially.

8. A sulphur-burning system according to claim 1 in which the annular region is located between an upper and a lower region separated by the annular region, the upper region being disposed atop the lower region and connected to it by an opening within the annular region, and in which the outlet port exits the upper region at an elevation above the annular region.

9. A sulphur-burning tower according to claim 3 in which the annular region is located between an upper and a lower region separated by the annular region, the upper region being disposed atop the lower region and connected to it by an opening within the annular region, and in which the outlet port exits the upper region at an elevation above the annular region.

10. A sulphur-burning tower according to claim 5 in which the annular region is located between an upper and a lower region separated by the annular region, the upper region being disposed atop the lower region and connected to it by an opening within the annular region, and in which the outlet port exits the upper region at an elevation above the annular region.

* * * * *